United States Patent Office 2,806,867
Patented Sept. 17, 1957

2,806,867

PERCHLOROFLUOROCARBOXYLIC ACID SALTS

William S. Barnhart, Cranford, and Robert H. Wade, West Paterson, N. J., assignors to The M. W. Kellogg Company, Jersey City, N. J., a corporation of Delaware No Drawing. Application April 18, 1955, Serial No. 501,782

8 Claims. (Cl. 260—408)

This invention relates to novel salts of perchlorofluorocarboxylic acids and to methods for the preparation thereof.

The novel salts of the present invention are useful as thickeners in grease formulations, as surfactants in emulsion polymerization systems, as rust inhibitors, as stabilizers for polychlorotrifluoroethylene oils, and as chemical intermediates in the preparation of amides, anhydrides, olefins, and the like.

The salts of the present invention may be prepared by reacting a free metal, such as lithium, potassium, calcium, sodium, magnesium, aluminum, or iron and the like, or a metal or ammonium cation liberating compound, in which the anion may be a halide, an acetate, hydroxyl, oxygen, sulfate, nitrate, carbonate, bicarbonate, or phosphate and the like, with a perchlorofluoro carboxylic acid having from about 4 to about 20 carbon atoms. This reaction may be illustrated as follows:

$$\text{acid} + M_m X_n \rightleftharpoons \text{acid salt} + HX$$

in which M is a metal or ammonium cation and X is an anion, such as one of those listed above, $m$ is an integer from 1 to 3 and $n$ is an integer from 1 to 4. In those cases where the perchlorofluorocarboxylic acid is reacted with a free metal, the formation of the acid salt is accompanied by the liberation of hydrogen gas.

The perchlorofluorocarboxylic acids which may be used may be prepared in a variety of ways. For example, they may be produced by subjecting perhalogenated aliphatic olefins having at least 7 carbon atoms and being at least half fluorinated to oxidation conditions in the presence of a vigorous oxygen-containing oxidation reagent, such as free oxygen in the presence of ultraviolet light, free oxygen in the presence of ultraviolet light and elemental chlorine, free oxygen in the presence of elemental fluorine, and permanganate salts in a liquid medium. Preparation of the acids according to this method is disclosed in copending application Serial No. 452,706, filed August 27, 1954.

The acids may also be prepared by subjecting aliphatic perhalogenated high polymers to thermal cracking conditions to produce lower molecular weight materials having molecular weights in the oil or wax range and subjecting these materials to oxidation at a temperature not higher than about 10° C. in the presence of a permanganate salt in a liquid medium. Processes of this type are disclosed in copending application Serial No. 452,704, filed August 27, 1954.

Another method for the preparation of perchlorofluorocarboxylic acids which are useful in the present invention comprises treating fluorine-containing telomers, having the formula $$R(CF_2—CX_1X_2)_n Br$$

in which R is a perhalomethyl radical having a total atomic weight not higher than 146.5, $X_1$ and $X_2$ are fluorine or chlorine atoms, and $n$ is an integer from 2 to 16, with fuming sulfuric acid at a temperature of at least 125° C. This process produces carboxylic acids having the formula $$Z(CF_2—CFCl)_{n-1} CF_2 COOH$$

in which Z is a carboxylic acid radical or a perhalomethyl radical having a total atomic weight not in excess of 146.5 and $n$ is an integer from 2 to 16. The preparation of these acids is disclosed in copending application Serial No. 452,703, filed August 27, 1954.

The preferred process for the preparation of perchlorofluorocarboxylic acids useful in the process of the present invention is the hydrolysis of telomers produced by telomerizing perhaloolefins using sulfuryl chloride as a telogen, the preferred telomer being the telomerization product of chlorotrifluoroethylene and sulfuryl chloride. The hydrolyzed telomer has the formula $$Z—CFCl—(CF_2CFCl)_{n-2}—CF_2—COOH$$

in which Z is a carboxylic acid radical or a perhalomethyl radical in which all the halogen atoms are fluorine or chlorine and $n$ is an integer from 2 to 16. The preparation of these acids is disclosed in copending application Serial No. 452,705, filed August 27, 1954.

When a compound having the formula MX, in which M and X are as given above, is reacted with a perchlorofluorocarboxylic acid to form an inorganic perchlorofluorocarboxylic acid salt, the MX compound should be one that is soluble in an aqueous solution if the inorganic perchlorofluorocarboxylic acid salt formed in the reaction is insoluble, and conversely, the MX compound should be one that is insoluble if the inorganic perchlorofluorocarboxylic acid salt formed in the reaction is soluble in an aqueous solution. Mutual solubility or insolubility of the MX compound and the acid salt formed during the reaction should be avoided due to the difficulties involved in the separation of pure acid salt from the MX compound unless a stoichiometric equivalent amount of MX compound to perchlorofluorocarboxylic acid is used in the reaction. The equilibrium in the equation given above is shifted to the right if the inorganic perchlorofluorocarboxylic acid salt formed in the reaction is insoluble or if the HX component is non-ionized or is insoluble.

Generally speaking, the novel salts of the present invention may be prepared in an aqueous system as follows: An aqueous solution or suspension of a perchlorofluorocarboxylic acid or a neutralized aqueous solution of a perchlorofluorocarboxylic acid (neutralized to a phenolphthalein end point with aqueous sodium hydroxide or potassium hydroxide), which may be a monoacid, diacid, or polyacid, is stirred in a vessel with a metal hydroxide, oxide, halide, salt, or a free acid at a temperature between about 20° C. and about 250° C., preferably between about 30° and about 120° C. The product begins to form immediately, and the reaction may be continued for a period of about 24 hours, but it is generally complete within about 5 hours. In cases where the MX compound is very soluble in water, the reaction is instantaneous. The crude product is separated from the reaction mixture by filtration if the product is insoluble, or if it is soluble, it may be separated by filtering off the inorganic salts and evaporating the filtrate to dryness.

The reaction may also be effected in a non-aqueous system, if desired, but this method is not preferred, as the danger exists of thermally decomposing the product. When this method is used, higher temperatures between about 100 and 150° C. may be used to boil off the inorganic by-products of the reaction as soon as they are formed. In a variation of the non-aqueous system, the formation of liquid by-products is avoided by reacting the perchlorofluorocarboxylic acid with a free metal, resulting in the evolution of hydrogen gas. The products obtained using the non-aqueous system are in a pure and solid state.

The concentration of perchlorofluorocarboxylic acid relative to MX compound is dependent upon the solubility of the MX compound and the inorganic perchlorofluorocarboxylic acid salt product in the aqueous solution. If both the MX compound and the inorganic perchlorofluorocarboxylic acid salt product are soluble in water, or if both are insoluble, a stoichiometric equivalent quantity of perchlorofluorocarboxylic acid to MX compound must be used in order to eliminate the difficulty of separating the reaction product from unreacted MX compound. The stoichiometric equivalent quantity may be ascertained by titrating the perchlorofluorocarboxylic acid with a solution of an inorganic metal hydroxide or salt to a phenolphthalein end point. If either, but not both, of the MX compound or the inorganic perchlorofluorocarboxylic acid salt product is insoluble in water, the molar ratio of perchlorofluorocarboxylic acid to MX compuond may vary between 1:0.5 and 1:10, preferably between about 1:5 and 1:1. These ratios are based upon the use of a monoacid, and if diacids or polyacids are used, the ratio is proportionately increased to compensate in favor of the MX compound.

The invention will be further illustrated by reference to the following specific examples:

EXAMPLE 1

*Preparation of $Cl(CF_2-CFCl)_3CF_2COONa$*

In a glass flask, 27.3 grams (0.057 mole) of $$Cl(CF_2-CFCl)_3-CF_2COOH$$

were dissloved in water, by warming to 40–50° C. on a hot plate, and neutralized to a phenolphthalein end point with a 5 percent sodium hydroxide solution. The resulting solution was concentrated in a stream of nitrogen gas and dried at 165° C. A yield of 80 percent of pure product was obtained.

EXAMPLE 2

*Preparation of $Cl(CF_2-CFCl)_3CF_2COOAg$*

In a glass apparatus, 11.7 grams (0.05 mole) of $Ag_2O$ were added with stirring to an aqueous solution of 48 grams (0.1 mole) of $Cl(CF_2-CFCl)_3CF_2COOH$ at 50–60° C. Two liters of water, at a temperature of 60° C. to 70° C., were added to dissolve the organic salt formed and the excess $Ag_2O$ precipitate was removed by filtration. The organic salt crystallized quickly on cooling and was filtered while cold to give 44 grams of pure

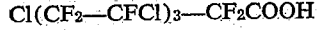

as a white solid in a 75 percent yield.

EXAMPLE 3

*Preparation of $[Cl(CF_2-CFCl)_3CF_2COO]_2Pb$*

A solution of lead nitrate was prepared by dissolving 4 m. eqs. (662 mg.) of $Pb(NO_3)_2$ in 10 ml. of water. This solution was added to 2 m. eqs. of almost neutralized $Cl(CF_2-CFCl)_3CF_2COOH$ in 100 ml. of water. The mixture was stirred for 15 minutes and the precipitated product was separated from the reaction mixture by filtration through sintered glass funnels. The filters were washed and dried in a vacuum oven at room temperature; the compound $[Cl(CF_2-CFCl)_3CF_2COO]_2Pb$ was obtained in a 78 percent yield.

EXAMPLE 4

*Preparation of $[Cl(CF_2-CFCl)_3CF_2COO]_4Sn$*

In a glass apparatus, 28.8 grams of

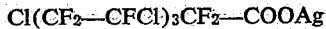

were added to 25 ml. of water and neutralized to a phenolphthalein end point with a 5 percent sodium hydroxide solution. To this solution 5.8 grams of $$SnCl_4 \cdot 5H_2O$$

were added with stirring. The precipitate, which formed within an hour, was filtered, washed with water, and dried overnight at 105° C. The product was obtained in a 75 percent yield.

EXAMPLE 5

*Preparation of $[Cl(CF_2-CFCl)_3CF_2COO]_2Ba$*

To 100 ml. of a neutralized aqueous solution containing 0.96 gram of $Cl(CF_2-CFCl)_3CF_2COOH$, 312 mg. of $BaCl_2$, dissolved in 10 ml. of water, were added. The mixture was stirred for 15 minutes at 30° C. and the resulting precipitate was washed with water and dried in a vacuum oven at 110° C.

$$[Cl(CF_2-CFCl)_3CF_2-COO]_2Ba$$

was obtained in a 55 per cent yield.

EXAMPLE 6

*Preparation of $[Cl(CF_2-CFCl)_3CF_2COO]_3Al$*

In a glass apparatus, 203 grams (0.42 mole) of $$Cl(CF_2-CFCl)_3CF_2COOH$$

were added to 50 ml. of water and neutralized with an aqueous potassium hydroxide solution. The neutralized solution was heated to 70° C. and 79 grams (0.21 mole) of $Al(NO_3)_3 \cdot 9H_2O$ were added with stirring. The precipitate, which formed immediately, was washed with water by decantation, filtered, and dried in a vacuum oven at 100° C. for 40 hours. A yield of 199 grams (97 percent) of product was obtained.

EXAMPLE 7

*Preparation of $[Cl(CF_2-CFCl)_3CF_2COO]_2Ca$*

To 100 ml. of a neutralized aqueous solution containing 0.96 gram of $Cl(CF_2-CFCl)_3CF_2COOH$, 354 mg. of $Ca(NO_3)_2 \cdot 4H_2O$ dissolved in 10 ml. of water were added. The mixture was stirred for 15 minutes at 30° C. and the resulting precipitate was washed and dried in a vacuum oven at 110° C. $[Cl(CF_2-CFCl)_3CF_2COO]_2Ca$ was obtained in a 40 percent yield.

EXAMPLE 8

*Preparation of $[Cl(CF_2-CFCl)_3CF_2COO]_3Cr$*

To 100 ml. of a neutralized aqueous solution containing 0.96 gram of $Cl(CF_2-CFCl)_3CF_2COOH$, 400 mg. of $Cr(NO_3)_3 \cdot 9H_2O$ dissolved in 10 ml. of water were added. The mixture was stirred for 15 minutes at 30° C. and the resulting precipitate was washed and dried in a vacuum oven at 110° C. $[Cl(CF_2-CFCl)_3CF_2COO]_3Cr$ was obtained in a 60 percent yield.

EXAMPLE 9

*Preparation of $[Cl(CF_2-CFCl)_3CF_2COO]_2Zn$*

To 500 ml. of a neutralized aqueous solution containing 202 grams (0.42 mole) of $Cl(CF_2-CFCl)_3CF_2COOH$ at 70° C., 41 grams (0.3 mole) of $ZnCl_2$ were added with stirring and the reaction was completed within an hour. The precipitate, which began to form immediately, was washed with water, filtered and dried in a vacuum oven at 100° C. for 40 hours. The product was obtained in a 95 percent yield (204 grams).

EXAMPLE 10

*Preparation of $[Cl(CF_2-CFCl)_3CF_2COO]_2Cd$*

In a glass apparatus, 28.8 grams of $$Cl(CF_2-CFCl)_3CF_2COOH$$

were added to 25 ml. of water and neutralized to a phenolphthalein end point with a 5 percent potassium hy-

EXAMPLE 11

*Preparation of* $Cl(CF_2-CFCl)_3CF_2COONH_4$

A 48 gram portion (0.1 mole) of $$Cl(CF_2-CFCl)_3CF_2COOH$$

was mixed with 100 ml. of water and neutralized with a 15 percent ammonium hydroxide solution. The mixture was evaporated to dryness on a hot plate and dried in an oven at 105° C. for 24 hours. A yield of 47.5 grams was obtained.

EXAMPLE 12

*Preparation of* $Cl(CF_2-CFCl)_3CF_2COOLi$

A 4.8 gram portion of $Cl(CF_2-CFCl)_3CF_2COOH$ was mixed with 15 ml. of water and neutralized with a solution of 0.30 gram of lithium hydroxide, dissolved in 15 ml. of water. The resulting solution was evaporated to dryness and further dried overnight in an oven at 75 to 100° C. The product was obtained in an 80 percent yield.

EXAMPLE 13

*Preparation of* $Cl(CF_2-CFCl)_3CF_2COOK$

The acid, $Cl(CF_2-CFCl)_3CF_2COOH$ (4.8 grams) was dispersed in 10 ml. of water, heated to 90° C., and neutralized with potassium hydroxide (0.60 gram) dissolved in 10 ml. of water, the latter solution being added gradually to the acid with stirring. The solution was evaporated to dryness and the residual salt was dried in a vacuum desiccator over $P_2O_5$. The product was obtained in a 75 percent yield.

EXAMPLE 14

*Preparation of* $Cl(CF_2-CFCl)_2CF_2COONa$

In a glass apparatus, a solution of 0.66 gram of sodium hydroxide dissolved in 10 ml. of water was added dropwise to 4.5 grams of $Cl(CF_2-CFCl)_2CF_2COOH$ dispersed in 10 ml. of water at about 90° C. until the pH was raised to 6. The solution was then evaporated to dryness and the residual salt was dried in a vacuum desiccator over $P_2O_5$. The product was obtained in a 60 percent yield.

EXAMPLE 15

*Preparation of* $[Cl(CF_2-CFCl)_2CF_2COO]_2Ca$

A 4.5 gram portion of $Cl(CF_2-CFCl)_2CF_2COOH$ was added to 10 ml. of hot water at 90° C. and neutralized. Calcium carbonate (0.82 gram) was then added to the solution with stirring. An immediate evolution of carbon dioxide was noted. An additional 10 ml. of water were added and the reaction mixture was held at 90° C. for one hour. The mixture was filtered to remove excess calcium carbonate, the filtrate was evaporated to dryness and the residual salt was dried in a vacuum desiccator over $P_2O_5$. $[Cl(CF_2-CFCl)_2CF_2COO]_2Ca$ was obtained in an 80 percent yield.

EXAMPLE 16

*Preparation of* $Cl(CF_2-CFCl)_2CF_2COOK$

In a glass apparatus, 4.8 grams of $$Cl(CF_2-CFCl)_2CF_2COOH$$

were dispersed in 10 ml. of water, heated to 90° C., and neutralized with 0.88 gram of potassium hydroxide dissolved in 10 ml. of water. The resulting solution was evaporated to dryness and the residual salt was dried in a vacuum desiccator over $P_2O_5$.

$$Cl(CF_2-CFCl)_2CF_2COOK$$

was obtained in an 80 percent yield.

EXAMPLE 17

*Preparation of* $[Cl(CF_2-CFCl)_2CF_2COO]_2Zn$

ZnO (0.53 gram) was added portionwise with stirring to neutralized $Cl(CF_2-CFCl)_2CF_2COOH$ (4.5 grams) dispersed in 10 ml. of water at 90° C. The mixture was maintained at 90° C. for one hour, after which it was filtered to remove excess ZnO, and the filtrate was evaporated to dryness. The product was obtained, after drying in a vacuum desiccator, in an 80 percent yield.

EXAMPLE 18

*Preparation of* $[Cl(CF_2-CFCl)_2CF_2COO]_3Al$

In a glass apparatus, $Al_2(SO_4)_3$ (1.88 grams) was added with stirring to $Cl(CF_2-CFCl)_2CF_2COOH$ (4.5 grams) dissolved in 25 ml. of hot water. A gelatinous precipitate was formed immediately. The reaction was completed within 2 hours, after which the precipitate was filtered from the solution and dried in vacuo. A yield of 75 percent of pure product was obtained.

EXAMPLE 19

*Preparation of* $Cl(CF_2-CFCl)_2CF_2COOLi$

In a glass apparatus, 4.5 grams of $$Cl(CF_2-CFCl)_2CF_2-COOH$$

were added to 15 ml. of water and neutralized to a phenolphthalein end point with a 0.35 gram portion of lithium hydroxide dissolved in 15 ml. of water, which was added to the acid solution with stirring. The resulting solution was evaporated to dryness and further dried overnight in an oven at about 100° C. The product was obtained in an 80 percent yield.

EXAMPLE 20

*Preparation of* $Al[OOC(CFCl-CF_2)_3COO]_3Al$

In a glass apparatus, 7.5 grams of $$HOOC(CFCl-CF_2)_3COOH$$

were added to 500 ml. of water and neutralized with potassium hydroxide solution. This solution was heated to 70° C. and 25 grams of $Al(NO_3)_3 \cdot 9H_2O$ were added with stirring. The precipitate, which was formed immediately, was washed with water by decantation, filtered, and dried in a vacuum oven at 100° C. for 40 hours. A 30 percent yield of product was obtained.

EXAMPLE 21

*Preparation of* $Cl(CF_2-CFCl)_4CF_2COONa$

A 6.0 gram portion of $Cl(CF_2-CFCl)_4CF_2COOH$ (0.01 mole) was mixed with 15 ml. of water and neutralized to a phenolphthalein end point with 0.44 gram (0.11 mole) of sodium hydroxide dissolved in about 15 ml. of water. The solution was evaporated to dryness and further dried overnight in an oven at 95 to 100° C. The product was obtained in a 75 percent yield.

EXAMPLE 22

*Preparation of* $Cl(CF_2-CFCl)_4CF_2COOK$

A 6.0 gram portion of $Cl(CF_2-CFCl)_4CF_2COOH$ (0.01 mole) was mixed with 15 ml. of water and neutralized with a solution of 0.6 gram (0.11 mole) of sodium hydroxide dissolved in 15 ml. of water, which was added with stirring. The resulting solution was evaporated, and dried overnight in an oven at 95° to 100° C. The product was obtained in a 75 percent yield.

EXAMPLE 23

*Preparation of* $[Cl(CF_2-CFCl)_4CF_2COO]_2Ca$

A 6.0 gram portion of $Cl(CF_2-CFCl)_4CF_2COOH$ (0.01 mole) was mixed with 20 ml. of water, neutralized and heated to about 90° C. To this solution, 0.55 gram (0.0055 mole) of calcium carbonate was added slowly. The reaction was completed after one hour and a precipitate was formed which was filtered from the solution and dried in an oven overnight. The product was obtained in a 70 percent yield.

EXAMPLE 24

*Preparation of* [Cl(CF$_2$—CFCl)$_4$CF$_2$COO]$_2$Zn

A 6.0 gram portion of Cl(CF$_2$—CFCl)$_4$CF$_2$COOH (0.01 mole) in solution was neutralized with aqueous potassium hydroxide and 0.8 gram (0.0055 mole) of zinc chloride was added to the solution with stirring. The reaction was run for one hour and the precipitate, which started to form immediately, was filtered, washed, and dried in an oven at 100° C. The product was obtained in a 70 percent yield.

EXAMPLE 25

*Preparation of* [Cl(CF$_2$—CFCl)$_4$CF$_2$COO]$_3$Al

A 6.0 gram portion of Cl(CF$_2$—CFCl)$_4$CF$_2$COOH (0.01 mole) in solution was neutralized with aqueous potassium hydroxide and 1.2 grams (0.0035 mole) of Al$_2$(SO$_4$)$_3$ were added to the solution with stirring. The reaction was run for one hour, and the precipitate, which began to form immediately, was filtered, washed and dried in an oven at 100° C. The product was obtained in a 75 percent yield.

EXAMPLE 26

*Preparation of* Cl(CF$_2$—CFCl)$_4$CF$_2$COOLi

A 6.0 gram portion of Cl(CF$_2$—CFCl)$_4$CF$_2$COOH in solution was neutralized with a solution of 0.3 gram of lithium hydroxide which was added to the acid solution with stirring. The reaction was run for one hour, and the resulting solution was evaporated to dryness and further dried in an oven at 100° C. The product was obtained in a 75 percent yield.

It will be obvious to those skilled in the art that many modifications may be made within the scope of the present invention without departing from the spirit thereof, and the invention includes all such modifications.

We claim:

1. A salt having the formula

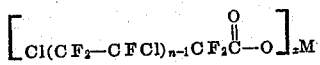

in which $n$ is an integer from 2 to 10, $x$ is an integer from 1 to 4, and M is selected from the group consisting of alkali metal, alkaline earth metal, iron, silver, zinc, cadmium, lead, aluminum, chromium, tin and ammonium cations.

2. A salt having the formula

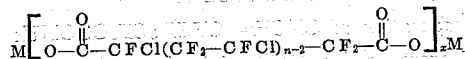

in which $n$ is an integer from 2 to 10, $x$ is an integer from 1 to 4, and M is selected from the group consisting of alkali metal, alkaline earth metal, iron, silver, zinc, cadmium, lead, aluminum, chromium, tin and ammonium cations.

3. An inorganic salt of an acid having the formula selected from the group consisting of

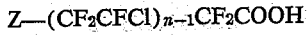

wherein Z is selected from the group consisting of a carboxylic acid radical and a perhalomethyl radical having a total atomic weight not in excess of 146.5, and

where Z is selected from the group consisting of a carboxylic acid radical and a perhalomethyl radical in which all the halogens are normally gaseous halogens, and $n$ in each of said formulas is an integer from 2 to 16, the inorganic portion of said salt being selected from the group consisting of alkali metal, alkaline earth metal, iron, silver, zinc, cadmium, lead, aluminum, chromium, tin and ammonium cations.

4. The sodium salt of Cl(CF$_2$CFCl)$_3$CF$_2$COOH.
5. The silver salt of Cl(CF$_2$CFCl)$_3$CF$_2$COOH.
6. The calcium salt of Cl(CF$_2$CFCl)$_3$CF$_2$COOH.
7. The aluminum salt of Cl(CF$_2$CFCl)$_2$CF$_2$COOH.
8. The ammonium salt of Cl(CF$_2$CFCl)$_3$CF$_2$COOH.

References Cited in the file of this patent

UNITED STATES PATENTS

| | | |
|---|---|---|
| 2,559,752 | Berry | July 10, 1951 |
| 2,567,011 | Diesslin et al. | Sept. 4, 1951 |
| 2,662,835 | Reid | Dec. 15, 1953 |